United States Patent [19]

Lewis

[11] 4,252,000
[45] Feb. 24, 1981

[54] APPARATUS AND PROCESS FOR COOLING AND MUFFLING INDUSTRIAL EQUIPMENT

[76] Inventor: Joseph L. Lewis, Star Rte. Box 40, Locust Grove, Va. 22508

[21] Appl. No.: 65,326

[22] Filed: Aug. 9, 1979

[51] Int. Cl.³ .................... F04B 17/00; F25D 19/00
[52] U.S. Cl. ................................ 62/188; 62/296; 62/307; 417/366
[58] Field of Search ............... 62/296, 188, 201, 121, 62/392, 307; 165/109, DIG. 11; 417/366

[56] References Cited

U.S. PATENT DOCUMENTS

| | | | |
|---|---|---|---|
| 2,590,061 | 3/1952 | Ash | 62/7 |
| 2,809,813 | 10/1957 | Fletcher | |
| 3,131,550 | 5/1964 | Kocher | 62/392 X |
| 3,279,683 | 10/1966 | Kleinlein | |
| 3,365,904 | 1/1968 | Ross | 62/177 |
| 3,369,736 | 2/1968 | Coleman | |
| 3,443,394 | 5/1969 | Knonick | 62/139 |
| 3,856,439 | 12/1974 | Moehrbach | 417/312 |
| 3,877,842 | 4/1975 | Greene et al. | 417/312 |
| 4,060,997 | 12/1977 | Shultz et al. | 62/180 |
| 4,144,718 | 3/1979 | Williams | 62/180 |

Primary Examiner—William E. Wayner
Attorney, Agent, or Firm—W. Brown Morton, Jr.; Thomas W. Cole

[57] ABSTRACT

An apparatus and process for cooling and muffling one or more pieces of exhaust emitting industrial equipment, such as a pair of vacuum pumps, is herein disclosed. The apparatus comprises a water cooling tank, an automatic water level control means for automatically maintaining the water in the tank to between a predetermined maximum and minimum level, and a thermostatically controlled refrigeration coil concentrically disposed within the tank for maintaining the temperature of the tank water to between a pre-selected range. The tank includes one or more muffling units substantially submerged in the water within the tank and pneumatically connected to the exhaust ports of the industrial equipment for muffling the exhaust noise of the equipment. The gases expelled from the industrial equipment pass through a plurality of small apertures in the submerged portions of the muffler units and create a plurality of small bubbles which effectively agitate the tank water around the refrigeration coil, thereby equilibrating the temperature of the water and eliminating the need for a separate agitation pump.

15 Claims, 5 Drawing Figures

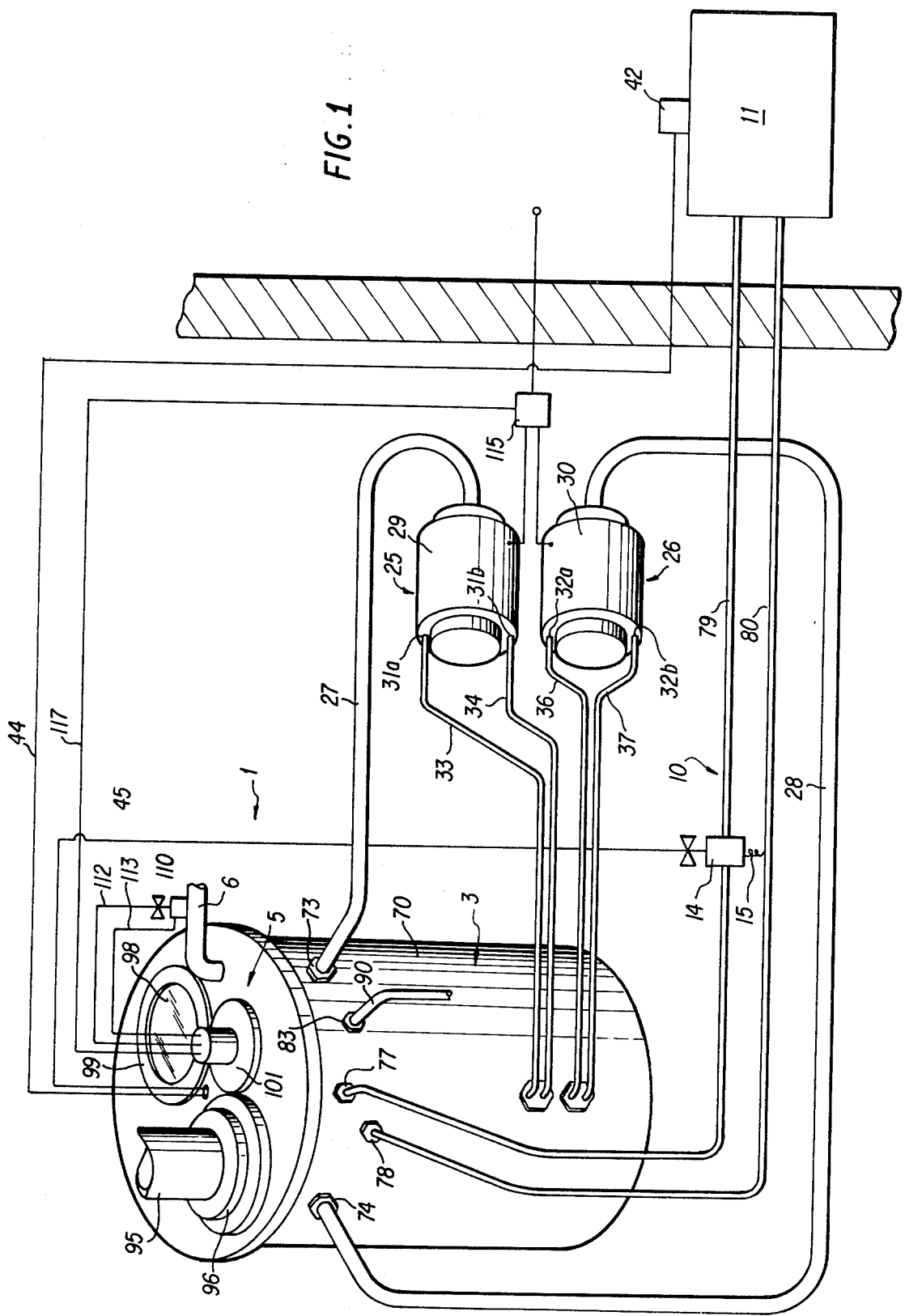

APPARATUS AND PROCESS FOR COOLING AND MUFFLING INDUSTRIAL EQUIPMENT

BACKGROUND OF THE INVENTION

This invention relates to an apparatus and process for cooling and muffling one or more pieces of exhaust emitting industrial equipment, such as a pair of vacuum pumps.

Many types of industrial equipment, such as vacuum pumps and air compressors, work more efficiently if some means is provided for removing the heat generated by gaseous compression and friction. Because water has the capacity to absorb relatively large quantities of heat, a number of water cooling and circulating devices for cooling industrial equipment have been developed in the prior art. Basically, such water cooling devices comprise a tank or reservoir for holding a supply of water and a refrigeration unit for cooling the water to within a desired temperature range. Water in the reservoir is circulated through or around the equipment to be cooled, which may be an air compressor, vacuum pump, or plastic molding machine, and circulated back into the reservoir, where it is again cooled down by the refrigeration unit. Examples of such cooling devices are disclosed in U.S. Pat. Nos. 2,590,061, 3,365,904, 4,060,997, and 4,144,718. Such devices may include some form of automatic liquid level control for maintaining the water level in a reservoir tank to within a predetermined range. Examples of such automatic liquid level controls may be found in previously mentioned Pat. Nos. 2,590,061, 4,060,997 and 4,144,718. Moreover, such cooling devices may also include some sort of thermostatic control arrangement for maintaining the temperature of the water in the reservoir tank to within a desired temperature range. Such thermostatic controls are exemplified by the systems disclosed in U.S. Pat. Nos. 4,060,997 and 4,144,718.

However, none of the previously mentioned prior art equipment cooling devices is without shortcomings. For example, the water in the cooling unit disclosed in the U.S. Pat. No. 2,590,061 patent must be continuously circulated around the refrigerating tank of the unit by means of a separate circulation pump in order to insure that the temperature of the water in the tank is uniform, and that the reading taken by the single thermostatic probe at the bottom of the tank is truly representative of the average water temperature of the tank. Similarly, the equipment cooler disclosed in U.S. Pat. No. 4,144,718 likewise utilizes a separate pump for agitating the water in the circulating water supply system. Even inventions as recent as that disclosed in U.S. Pat. No. 4,060,997 also suggests the use of a separate pump to circulate the water through the reservoir and heat exchanger in order to equilibrate the temperature thereof. Thus, each of these patents either discloses or suggests the use of a separate, expensive, energy consuming pump to agitate water in the system to equilibrate the temperature thereof so that the thermostat system will work properly. Additionally, the thermostatic control disclosed in the U.S. Pat. No. 4,060,997 patent is undesirably complicated, being controlled by the composite electronic signal of two separate temperature probes, one of which is located on the return side of the water circulation path, the other of which is located on the supply side of this path.

The shortcomings associated with prior art cooling devices illustrate the need for a simple, inexpensive and efficient equipment cooling device which is capable of cheaply and thoroughly agitating its water supply to a uniform temperature throughout so that a simple, inexpensive thermostatic system which senses the temperature of the water at only one particular area may be employed to accurately maintain the water temperature to between a desired temperature range.

Also known in the prior art are muffling units for muffling the exhaust noises associated with various types of industrial equipment. Specifically, U.S. Pat. No. 3,856,439 illustrates a muffling unit for a portable air compressor comprising a soundproofed and air cooled shell which envelopes the compressor. Similarly, U.S. Pat. No. 3,877,842 discloses a dampening or muffling unit for a vacuum pump comprising a cavity filled with a cellular material having inefficient vibration transmission characteristics.

However, none of these references effectively converts the energy present in the hot exhaust gases into useful work.

Such prior art references clearly illustrate the need for a more efficient muffling unit which both efficiently muffles the irritating exhaust noises emanating from industrial equipment such as air pumps and compressors, and efficiently converts the energy present in the hot exhaust gases into useful work.

SUMMARY OF THE INVENTION

Generally speaking, the invention provides both a more efficient water cooling device for cooling one or more pieces of exhaust emitting industrial equipment, as well as a more efficient muffling unit for both muffling the exhaust noises emanating from such industrial equipment and converting the energy contained in the exhaust gases into useful work. The apparatus basically comprises a water cooling tank for providing a supply of cooled water, a water supply conduit for filling the tank to between a predetermined maximum and minimum level, an electrically actuated water supply valve for regulating the flow of water from the water supply conduit to the tank, an automatic water level control means electrically connected to the water supply valve for automatically maintaining the level of water in the tank to between a predetermined maximum and minimum level, a thermostatically controlled refrigeration coil for maintaining the temperature of the water in the tank between a preset minimum and maximum value, at least one pair of water circulating conduits in fluid communication with the industrial equipment to be cooled, and preferably two muffling units pneumatically connected to the exhaust ports of each of the pieces of industrial equipment and substantially submerged in the water in the water cooling tank.

Each of the muffling units includes a plurality of apertures for quietly and forcefully passing the exhaust gases emitted from the industrial equipment through the water in the water cooling tank in the form of a plurality of small bubbles. These gas bubbles effectively agitate the water in the water cooling tank around the refrigeration coil, thereby equilibrating the temperature of the water in the tank so that a simple thermostatic control system may be effectively employed in the apparatus. Furthermore, the bubble agitation of the water in the tank eliminates the need for a separate water circulation pump.

Further, each of the muffling units includes a syphon breaker for preventing water from being syphoned out of the cooling tank and into the exhaust ports of the equipment.

Additionally, the automatic water level control means of the invention includes an emergency low water level probe connected to a relay which controls the input of power to the industrial equipment for deactivating the equipment should the water level in the water tank fall below a level which would damage the equipment being cooled by of the invention.

Moreover, the lid of the cooling tank of the invention includes a plexiglass window so that a visual determination may easily be made of whether or not the apparatus of the invention is properly functioning without removing the lid or the stack of the apparatus.

Finally, many other inventive features of the apparatus and process detailed herein will become apparent in the forthcoming detailed description of the invention.

BRIEF DESCRIPTION OF THE DRAWINGS

FIG. 1 is a perspective schematic view of the preferred embodiment of the invention illustrating the use of the invention with pair of vacuum pumps;

DETAILED DESCRIPTION OF THE PREFERRED EMBODIMENT

Figure 3:
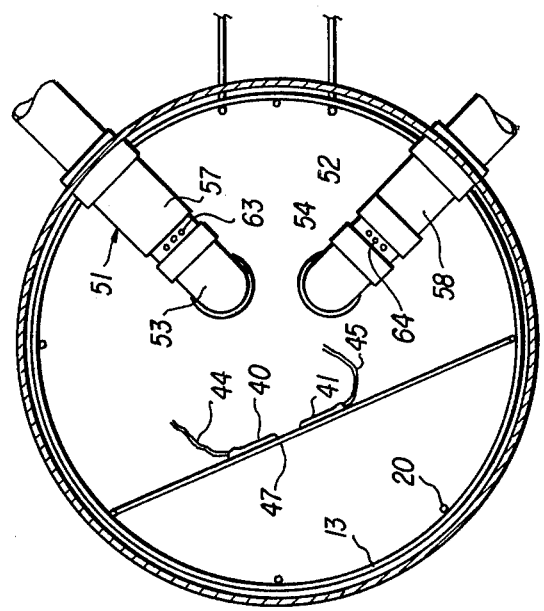
FIG. 3 is a plan elevational view of the cooling tank of the invention with the lid removed illustrating the inside of the cooling tank.

FIG. 1 illustrates how the preferred embodiment of the invention 1 may be used to cool and muffle a pair of conventional vacuum pumps 25, 26. Each of these pumps includes an exhaust port (not shown) through which exhaust gases are forcefully expelled, as well as a water circulation jacket 29, 30 through which water may be circulated in order to effectively cool the pumps. Further, each of the water circulation jackets 29, 30 of these pumps has a pair of water circulation ports 31a, b and 32a, b for accepting chilled water from a chilled water source and circulating it back again.

Figure 5:
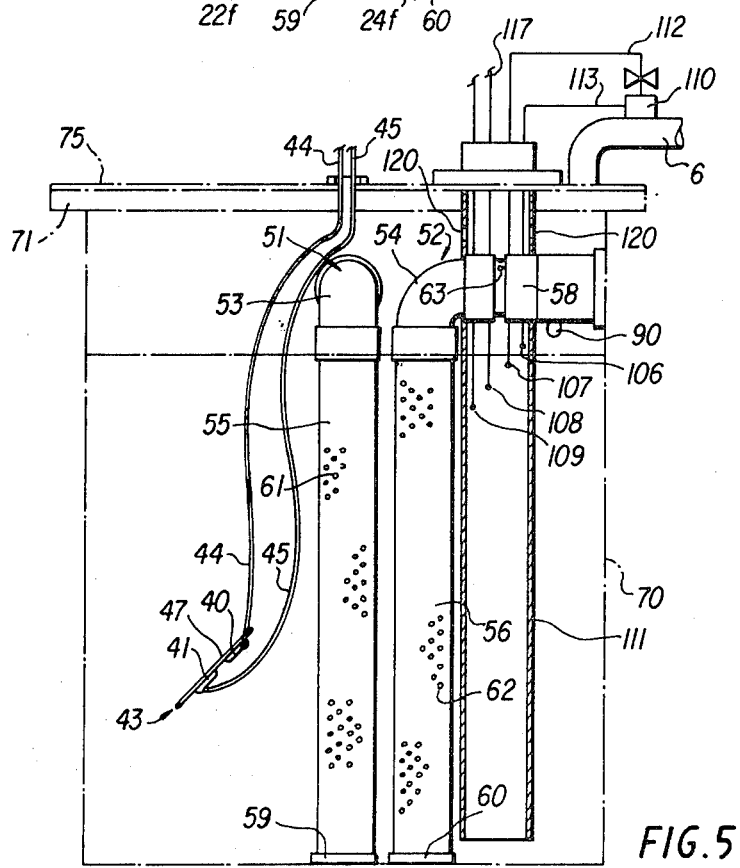
FIG. 5 is a side view of the muffling units and automatic water level control of the preferred embodiment of the invention.

With reference to FIGS. 1 and 5, the preferred embodiment of the invention generally comprises a cooling tank 3 for cooling a quantity of water, an automatic water level control means 5 for maintaining the water level in the tank to between a predetermined maximum and minimum level, a thermostatically controlled refrigeration unit 10 for maintaining the temperature of the water between a preset temperature range, and a pair of muffling units 51, 52 located inside the cooling tank 3 and substantially submerged within the water contained therein for both muffling the exhaust noises associated with the pumps 25, 26 and agitating the water contained in cooling tank 3. Each of the water circulation jackets 29, 30 of pumps 25, 26 is fluidly connected to the water contained in cooling tank 3 by means of two pairs of water conduits 33, 34, and 36, 37, respectively. Further, each of the exhaust ports (now shown) of pumps 25, 26 is pneumatically connected to muffling units 51, 52 via conduits 27, 28 as shown.

Cooling tank 3 includes a fiberglass barrel 70 having an open top circumscribed by a rim 71. The top of barrel 70 is covered by a steel lid 75 which preferably sealingly engages the barrel rim 71 in an air tight relationship. Near the top of the barrel 70 are a pair of fittings 73, 74 for pneumatically connecting each of the exhaust conduits 27, 28 with its respective muffling unit 51, 52. Additionally, fittings 73, 74 are sealed in water tight relationship with barrel 70 to prevent water from leaking out of the interior of barrel 70 and down its sides. Barrel 70 also includes a pair of fittings 77, 78 through which refrigerant inlet and outlet tubes 79, 80 pass. Like muffling unit fittings 73, 74, refrigerant tubing fittings 77, 78 are water tight. Additionally, barrel 70 includes a water tight fitting 83 for overflow drain 90. Finally, barrel 70 includes a pair of water conduit fittings 85, 86 through which water circulation conduits 33, 34, 36, 37 pass. Water conduit fittings 85, 86 are preferably located near the bottom of the barrel in order both to draw off the cooler water in barrel 70, which naturally gravitates toward the bottom of the tank, as well as to facilitate the agitation of the water contained in barrel 70 by injecting warm water returning from the water jackets 29, 30 of pumps 25, 26 up through the bottom of the barrel 70. Fittings 85, 86 must be water tight since they are well below the normal water line of the water contained within the barrel 70.

Figure 2:
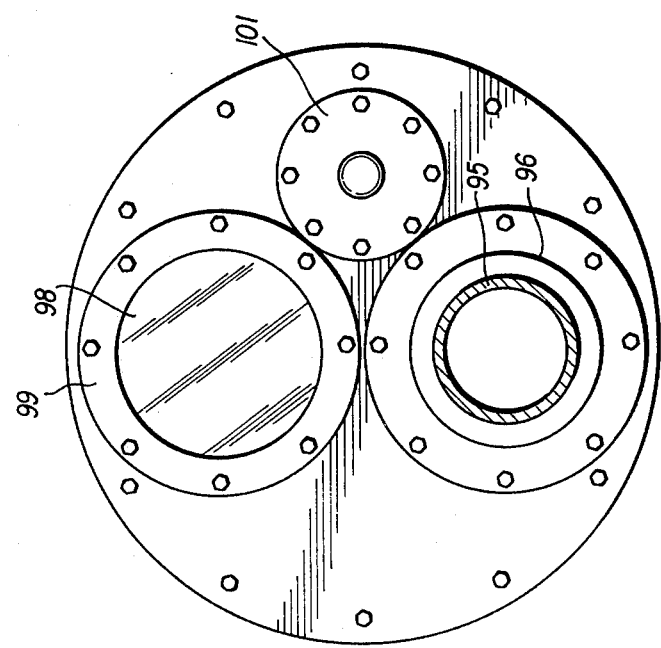
FIG. 2 is a plan elevational view of the cooling tank of the invention illustrating the lid of the cooling tank of the preferred embodiment of the invention.

With reference now to FIGS. 1 and 2, barrel lid 75 includes an exhaust stack 95 which is mounted onto the lid 75 in air tight relationship by means of stack ring 96. Exhaust stack 75 is in turn pneumatically connected to an air vent (not shown). If the vacuum pumps are part of the air conditioning system of a building, then exhaust stack 75 may be pneumatically connected to any exhaust stack in the building. The air tight seal between barrel 70 and lid 75 and again between exhaust stack 95 and lid 75 serves two functions. First, these seals reduce any residual exhaust noises which might remain after the exhaust gases from pumps 25, 26 pass through substantially submerged muffling units 51, 52 by confining such noise to barrel 70 and stack 75. Second, these seals prevent unwanted exhaust gases from leaking into the inside of the building or other structure where the pumps 25, 26 are housed.

Additionally, barrel lid 75 includes a plexiglass window 98 also mounted in air tight relationship on lid 75 by means of window mounting ring 99. Again, the purpose of the air tight mounting of the window 98 to the lid 75 is to confine residual exhaust noises and prevent unwanted exhaust gases from leaking out of the system after the exhaust gases have passed through muffling units 51, 52. Further, window 98 is preferably twelve or more inches in diameter so that sufficient light may enter the barrel 70 to allow the interior of the barrel 70 to be easily visually inspected. Thus an observer looking down through window 98 may easily determine whether or not the apparatus is functioning properly without having to dismantle stack 95 and lid 75.

Finally, barrel lid 75 includes a probe mounting ring 101 for likewise mounting both the water level control probes 106, 107, 108, 109 of the water level control system 5 and the thermocouples 40, 41 of the thermostatic control system in barrel 75 in a noise and leak confining, air tight relationship. Barrell lid 75 is preferably sealed onto rim 71 by means of a silicon caulking compound, as are all of the previously mentioned fittings, due to the favorable physical properties associated with such compounds.

With reference to FIGS. 1 and 5, the water level control means 5 generally comprises an overflow drain 90, and a set of four electric probes 106, 107, 108, 109 operably connected to both an electrically operated water supply valve 110 and pump power relay 115. Specifically, probes 106 and 107 determine the high water and minimum water level inside barrel 70 and are each electrically connected to water supply valve 110 via wires 112 and 113, respectively. When the water level in barrel 75 falls below the level of minimum level probe 107, probe 107 transmits an electric signal over wire 113 which opens water supply valve 110 and allows water supply conduit 6 to inject water into the interior of barrel 70 from a source of water under pressure (not shown). Conversely, when the water level in barrel 70 rises above the level of water shut off probe 106, probe 106 transmits an electric signal over wire 112 to water supply valve 110 which closes the valve 110. The electrically operated water supply valve 110 is preferably an AZCO brand solenoid operated valve, catalog number 8263B206.

Overflow drain 90 defines the maximum allowable water level in the tank and effectively drains off any excess water which accumulates in barrel 70 over this maximum level due to the presence of moisture in the exhaust gases passing through muffling units 51, 52.

Thus probes 106, 107, water valve 110 and overflow drain 90 cooperate to automatically maintain the water level in barrel 70 to between a minimum determined by the level of probe 107, and a maximum level determined by the level of overflow drain 90.

As a safety feature, water level control 5 also includes an electric probe 108 located below the minimum water level probe 107 which is electrically connected to a normally closed pump power relay 115 via wire 117. Probe 108 is positioned deep enough in barrel 70 to detect a dangerously low water level condition in barrel 70, and serves to switch pumps 25, 26 off when this condition arises by transmitting an electrical signal to pump power relay 115 before any damage occurs to the system, such as an overheating of pumps 25, 26.

Finally, water level control means 5 includes probe 109 which is normally always submerged in the water contained within barrel 70 and serves to electrically ground all of the other probes 106, 107, 108. In the preferred embodiment, each of the electric probes of the system are B/W Corporation's type E-55-3 cast flanged electrode holders. Further, all of the probes 106, 107, 108 and 109 are housed in cylindrical probe housing 111 which prevents the probes from falsely responding to temporary changes in the water level resulting from the agitation thereof by muffling units 51, 52. Such a housing should include vent holes 120 so that the water level control may be easily submerged in the water in barrell 70. A number 40 WIP iron pipe has been found to make a satisfactory housing.

Figure 4:
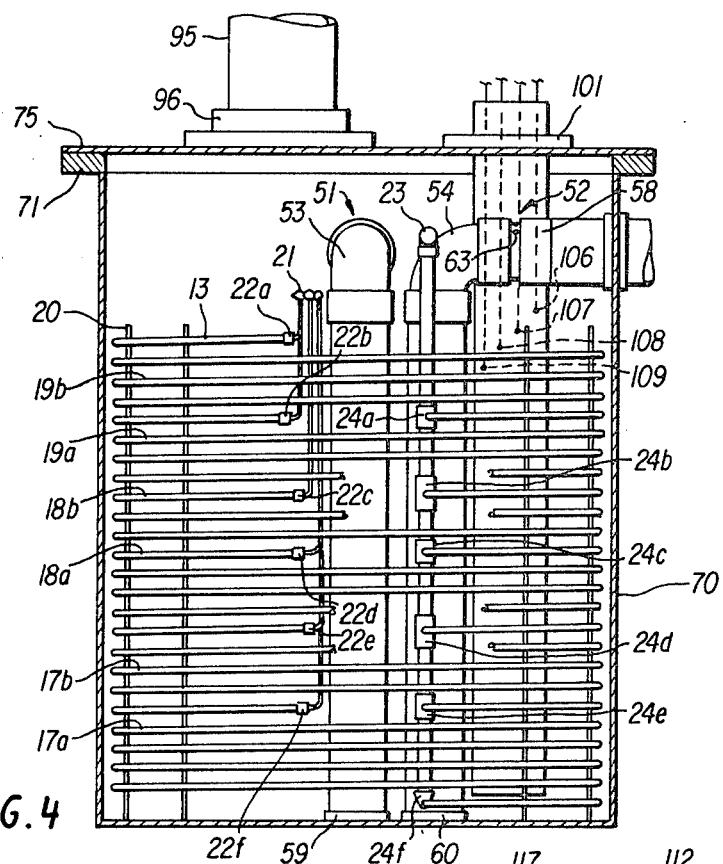
FIG. 4 is a side partial cross sectional view of the cooling tank of the invention illustrating the refrigeration coil and muffling units of the preferred embodiment of the invention.

With reference now to FIGS. 1, 4 and 5, the thermostatically controlled refrigeration unit 10 of the invention generally comprises a compressor unit 11 fluidly connected to a refrigeration coil 13 via refrigerant inlet tube 79 and refrigerant outlet tube 80. Refrigerant inlet tube 79 includes a conventional refrigerant expansion valve 14 which may be a Sporlan brand number CF3C expansion valve. An equalizer tube 51 fluidly connects the expansion valve 14 with refrigerant outlet tube 80 in a conventional manner.

The refrigeration coil 13 of the refrigeration unit 10 is substantially cylindrical in shape and is concentrically disposed within barrel 70, as illustrated in FIG. 3, the coil 13 being evenly separated from the interior surface of barrel 70 by only about one half of an inch to allow water in barrel 70 to freely and evenly circulate around all surfaces of the coil 13. Further, the coil 13 is disposed beneath the minimum water level probe 107, as illustrated in FIG. 4, in order to insure that all cooling portions of the coil 13 will be completely immersed in the water in barrel 70.

With further reference to FIG. 4, coil 13 is actually formed from six sub coils 17a, b, 18a, b, and 19a, b, which are soldered together in stacked relationship on vertical support rods 20. Each of these sub coils 17a, b, 18a, b, and 19a, b is individually connected to the end 21 of refrigerant inlet tube 79 at junctions 22a, b, c, d, e, and f. Each of the subcoils 17, 18 and 19 is also individually connected to the end 23 of refrigerant outlet tube 80 at junctions 24a, b, c, d, e, and f. The use of six sub coils in stacked relationship instead of a single large coil renders the composite coil 13 more efficient in cooling the water contained within barrel 70. Preferably, number 12 freon is used in the refrigeration coil 13.

With reference now to FIGS. 1 and 5, the thermostatic control of refrigeration unit 10 basically comprises two thermocouples 40, 41, temperature control unit 42, and expansion valve 14. Each of the thermocouples 40, 41 is mechanically connected to a thermocouple anchor 43 which is soldered between two of the vertical support rods 20 in the vicinity of the joint between the top of sub coil 17b and the bottom of sub coil 18a. Further, each of the thermocouples 40, 41 is fluidly connected to temperature control unit 42 and expansion valve 14, respectively, via fluid conduits 44 and 45. Temperature control unit 42 is in turn electrically connected to the compressor unit 11, and operates in conventional fashion to actuate compressor unit 11 when thermocouple 40 generates a fluid pressure signal which indicates that the water in the barrel 70 has risen above a certain preselected maximum temperature, and conversely, to deactuate compressor 11 when thermocouple 40 generates a fluid pressure signal which indicates that the water temperature in barrel 70 has fallen below a certain preselected minimum temperature. Preferably, temperature control unit 42 and thermocouple 40 are both part of a Honeywell refrigeration control number T6031A 1029, although any number of other commercial temperature control units may be satisfactorily used in the invention.

Thermocouple 41, as previously stated, is fluidly connected to expansion valve 14 and operates to dilate or contract the opening (not shown) through which the refrigerant flowing through refrigerant inlet tube 79 passes in route to refrigeration coil 13 in accordance with the temperature it senses. The purpose of thermocouple 41 is to maximize the efficiency of the refrigeration unit 10 by dilating or contracting the valve opening in valve 14 to the cross sectional area. Normally, expansion valve thermocouples such as thermocouple 41 are placed in contact with the ambient atmosphere, rather than in the refrigerated medium. It is a feature of the invention that thermocouple 41 is placed in contact with the refrigerated medium (i.e. the water in barrel 70) rather than the ambient atmosphere. Preferably, both expansion valve 14 and thermocouple 41 are part of a Sporlan brand number CF3C expansion valve assembly.

With reference to FIGS. 3, 4, and 5, the muffling system of the invention basically comprises a pair of muffling units 51, 52 pneumatically connected to the exhaust ports of vacuum pumps 25, 26 via exhaust conduits 27 and 28, respectively.

In the preferred embodiment, each of the muffling units 51, 52 includes an elbow joint 53, 54 to which a muffling section 55, 56 and a syphon breaker section 57, 58 are threadably connected. The joints 53, 54 muffling sections 55, 56 and syphon breaker sections 57, 58 are each preferably made of polyvinyl chloride piping.

Each of the muffling sections 55, 56 should be long enough to extend to the bottom of barrel 70 when their respective syphon breaker sections 57, 58 are mounted in the side wall of barrel 70 above the maximum water level by means of water tight packings 73, 74. Further, each of the muffling sections 55, 56 are pneumatically capped at the end abutting the bottom of barrel 70 by means of polyvinyl chloride pipe caps 59, 60. Finally, each of the muffling sections 55, 56 contains approximately two hundred uniformly spaced one-eighth inch diameter holes or apertures 61, 62, each of which is located below minimum water level probe 107. Each of these sets of apertures passes exhaust gases expelled by pumps 25, 26 through the water in barrel 70.

Each of the syphon breaker sections 57, 58 are located above overflow drain 90, and includes three one-eighth inch diameter holes or apertures 63, 64 for breaking any syphoning pressure which might accumulate in either of the two sections of the muffling units 51, 52 as a result of temporary back pressure in the exhaust conduits 27, 28 of pumps 25, 26. Thus syphon breaking sections 57, 58 prevent water from barrel 70 from backing up into pump exhaust conduits 27, 28 by placing a non-submerged portion of muffling units 51, 52 into communication with the ambient air.

As best illustrated in FIG. 3, the length of syphon breaking sections 57, 58 of muffling units 51, 52 are preferably chosen so that neither of the bubble producing muffling sections 55, 56 is placed directly in the center of barrel 70, but rather are drawn off a little toward the side wall of barrel 70 as shown. Such off center spacing facilitates a more uniform agitation of the water in barrel 70 by providing more uniform pattern of bubble dispersion across the cross sectional area of the water in barrel 70.

With further reference to FIG. 3, it should be noted that thermocouple anchor is mounted along a chord having a section 47 which is approximately midway between muffling sections 56, 57 and the side wall of barrel 70. Further, as previously mentioned, thermocouple anchor 43 is mounted approximately one third up from the bottom of barrel 70 in the vicinity of the joint between bottom sub coil 17 and middle sub coil 18. Such spacing allows thermocouples 40 and 41 to be mounted within a volume of water in barrel 70 which is accurately representative of the overall mean temperature of all the water in barrel 70.

It should be noted that the invention 1 also encompasses a process, as well as the previously described apparatus, for cooling and muffling one or more pieces of exhaust emitting industrial equipment.

With reference to FIGS. 1 and 5, the first step of the process may include cooling the water contained in barrel 70 to between a predetermined minimum and maximum temperature by means of a thermostatically controlled refrigeration unit 10 having a refrigeration coil 13 which is completely submerged in the barrel water. The second step of the process may include circulating the cooled water from barrel 70 through the inlet ports 31a, 32a of the water jackets 29, 30 of pumps 25, 26. The third step of the process may include circulating the water which flows out of water jackets 29, 30 through water exit ports 31b, 32b into the bottom of barrel 70 both to replace the water drawn from barrel 70 and to create a warm water eddy current at the bottom of barrel 70 which serves to agitate the water in barrel 70. The fourth and final step of the process includes passing the exhaust gases expelled from pumps 25, 26 through the apertures 61, 62 of the muffling sections of muffling units 51, 52 in order to muffle the exhaust noise of the gaseous exhausts expelled from pumps 25, 26, and to thoroughly agitate the water contained in barrel 70, thereby equilibrating the temperature of the water therein.

It is apparent from the foregoing detailed description that numerous modifications may be made both to the apparatus and process of the invention without departing from the spirit of the invention. For example, many types of materials and any number and shape of muffling units may be used in conjunction with the invention. Further, it is apparent that the apparatus of the invention is compatible with a wide variety of other types of exhaust expelling industrial equipment, such as air compressors, or the like. Finally, it is apparent that the number and pattern of apertures in the muffling units may be substantially altered without departing from the spirit of the invention.

Having specifically described the invention in such full, clear, concise and exact terms as to enable any person skilled in the art to make and use the same, I claim:

1. An apparatus for cooling and muffling one or more pieces of industrial equipment, each having a port for the expulsion of gaseous exhausts therethrough, and a cooling system including an inlet port and outlet port for circulating water therethrough, comprising:

(a) a water cooling tank for providing a supply of cooled water for cooling said pieces of industrial equipment;

(b) a water supply conduit for filling said tank to between a predetermined maximum and minimum level, said water supply conduit having one end in fluid communication with the interior of said tank and another end fluidly connected to a source of water under pressure, said water supply conduit further including an electrically actuated water supply valve for regulating the flow of water from said source to said interior of said tank;

(c) an automatic water level control means electrically connected to said water supply valve for automatically maintaining the level of water in said tank to between a predetermined maximum and minimum level, said control means including an overflow drain for draining water out of said tank when said level of water exceeds said predetermined maximum level;

(d) a refrigeration unit for maintaining the temperature of said water in said tank between a preset minimum and maximum value, said unit including a refrigeration coil concentrically disposed within said interior of said tank below said minimum water level;

(e) at least one pair of water circulating conduits in fluid communication with said inlet and outlet ports of said cooling system of said equipment, respectively, and said water in said tank for circulating said water from said tank through each of said one or more pieces of industrial equipment, and (f) at least one muffling unit pneumatically connected to said exhaust ports of each of said one or more pieces of industrial equipment and substantially submerged within said water inside said tank for muffling the exhaust noise of said pieces of industrial equipment, said exhaust muffler including a plurality of apertures for forcefully passing exhaust gases through said water inside said tank and agitating it around said refrigerator coil, thereby equilibrating the temperature of said water.

2. The cooling and muffling apparatus of claim 1 wherein said water level control means further includes:

(a) a first water level sensor electrically connected to said water valve for sensing said predetermined minimum water level and electrically opening said water valve and allowing water to flow from said pressurized water source into said interior of said tank, and (b) a second water level probe electrically connected to said water valve for sensing a high water level and electrically closing said water valve and stopping the flow of water from said pressurized water source into said interior of said tank.

3. The cooling and muffling apparatus of claim 2 wherein said refrigeration coil includes a refrigeration fluid inlet port and a refrigeration fluid outlet port, and said refrigeration unit further includes:

(a) a compressor unit including an electrically powered compressor, (b) first and second refrigeration fluid conduits fluidly connected to said refrigeration fluid inlet port of said coil and said compressor unit, and said refrigeration fluid outlet port of said coil and said condensor unit, respectively, said first fluid conduit including an electrically controlled refrigeration fluid expansion valve, (c) first and second thermocouples submerged in said water in said tank and fluidly connected to said compressor unit and said expansion valve, respectively, for sensing the temperature of said water and actuating and deactuating said compressor and contracting and dialating the opening in said expansion valve, sensing said preset minimum temperature and said preset maximum temperature.

4. The cooling and muffling apparatus of claim 3 wherein said first and second thermocouples are substantially centrally disposed within said submerged refrigeration coil.

5. The cooling and muffling apparatus of claim 1 wherein each of said muffling units includes a syphon breaker section having an aperture disposed above said maximum water level for preventing water in the tank from being syphoned into said exhaust port of said piece on industrial equipment.

6. The cooling and muffling apparatus of claim 5 wherein each of said muffling units is substantially centrally disposed within said refrigeration coil.

7. The cooling and muffling apparatus of claim 1 wherein each of said muffling units comprises an elbow joint having a muffling section submerged in said water in said tank and substantially centrally disposed within said refrigeration coil, and a syphon breaker section disposed above said maximum water level of said tank, said syphon breaker section including at least one aperture for preventing water in the tank from being syphoned into said exhaust port of said piece of industrial equipment.

8. The cooling and muffling apparatus of claim 7 wherein said syphon breaker sections of each of said muffling units terminates in a mouth portion mounted onto the side of said tank and pneumatically connected to said exhaust port of said piece of industrial equipment.

9. The cooling and muffling apparatus of claim 8 wherein said muffling section of each of said muffling units terminates in a cap which abuts the bottom of said tank.

10. The cooling and muffling apparatus of claim 1 wherein said tank includes an open top circumscribed by a rim, and a lid sealingly engaged around said rim in air tight relationship for confining residual exhaust noises emanating from said muffling units inside said tank.

11. The cooling and muffling apparatus of claim 10 further including a stack sealingly engaged to said lid in air tight relationship for venting exhaust gases emitted from said muffling units out to the ambient atmosphere.

12. The cooling and muffling apparatus of claim 10 wherein said lid of said tank further includes a window portion for exposing said interior of said tank to view whereby the functioning or malfunctioning of said apparatus may be conveniently visually determinable.

13. The cooling and muffling apparatus of claim 1 further including a normally closed switching means for deactivating said one or more pieces of industrial equipment, and wherein said automatic water level control means further includes an electric probe electrically connected to said switching means for sensing a predetermined low level water condition and for deactivating said equipment.

14. An apparatus for cooling and muffling first and second vacuum pumps, each of which includes an exhaust port, and a cooling system having an inlet port and an outlet port for circulating water through said pumps, comprising:

(a) a substantially cylindrical water cooling tank for providing a reservoir of cooled water to each of said cooling systems of said pumps;

(b) a water supply conduit having one end in fluid communication with the interior of said tank and another end in fluid communication with a source of water under pressure, said water supply conduit including an electrically actuated water supply valve for regulating the flow of water from said source into the interior of said tank;

(c) an automatic liquid level control means for automatically maintaining the water level in the interior of said tank between a predetermined maximum and minimum level, said control means including:

(i) a first water level sensor electrically connected to said water supply valve for detecting said minimum level condition and electrically actuating said valve into an open position whereby water flows from said source into the interior of said tank, and (ii) a second water level sensor electrically connected to said water valve for detecting a high water level condition and electrically actuating said water supply valve into a closed position, thereby blocking flow of water from said source into the interior of said tank, and (iii) an overflow drain for draining water out of the interior of said tank when the water level rises above said maximum level condition;

(d) a thermostatically controlled refrigeration unit for cooling the water in the interior of the tank to between a preset maximum and minimum temperature, including:

(i) a cylindrical refrigeration coil concentrically disposed within said tank, said coil being located below said minimum water level of said tank;

(ii) a compressor unit;

(iii) a thermocouple unit substantially centrally submerged in said water in said tank for generating a fluid pressure signal indicative of the temperature of said water;

(iv) a temperature control unit fluidly connected to said compressor unit and said thermocouple unit for actuating said compressor unit when said thermocouple indicates that the temperature of said water is above said preset maximum, and deactuating said refrigeration unit when said thermocouple indicates that the temperature of said water is below said preset minimum;

(e) first and second pairs of water circulating conduits for circulating water from said cooling tank through each of said pumps, (i) said first pair of water circulating conduits including first and second circulating conduits fluidly connecting said inlet port and outlet port of said first pump to the interior of said tank respectively, (ii) said second pair of water circulating conduits including third and fourth circulating conduits fluidly connecting said inlet port and said outlet port of said second pump to the interior of said tank, respectively, and (f) first and second muffling units pneumatically connected to each of said exhaust ports of said first and second pumps, respectively, and substantially submerged within said water inside said tank for muffling the exhaust noise of said vacuum pumps, each of said mufflers including a plurality of apertures for forcefully passing exhaust gases through said water inside said tank and agitating it around said refrigerator coil, thereby equilibrating the temperature of said water.

15. The process for cooling and muffling one or more pieces of industrial equipment, each of which includes an exhaust port for expelling gaseous exhausts, and a cooling system having an inlet port and an outlet port for circulating water, comprising the steps of (a) cooling a reservoir of water to between a predetermined maximum and minimum temperature by means of a thermostatically controlled refrigeration coil submerged in said reservoir;

(b) circulating water from said reservoir through said inlet port and said outlet port of said cooling system of each of said pieces of industrial equipment, and (c) passing exhaust gases from each of said pieces of industrial equipment through a plurality of apertures in one or more muffler units substantially submerged in said water of said reservoir to muffle the exhaust noise of said pieces of industrial equipment and to agitate said water in said reservoir, thereby equilibrating the temperature of said water in said reservoir.

* * * * *